Figure 1:
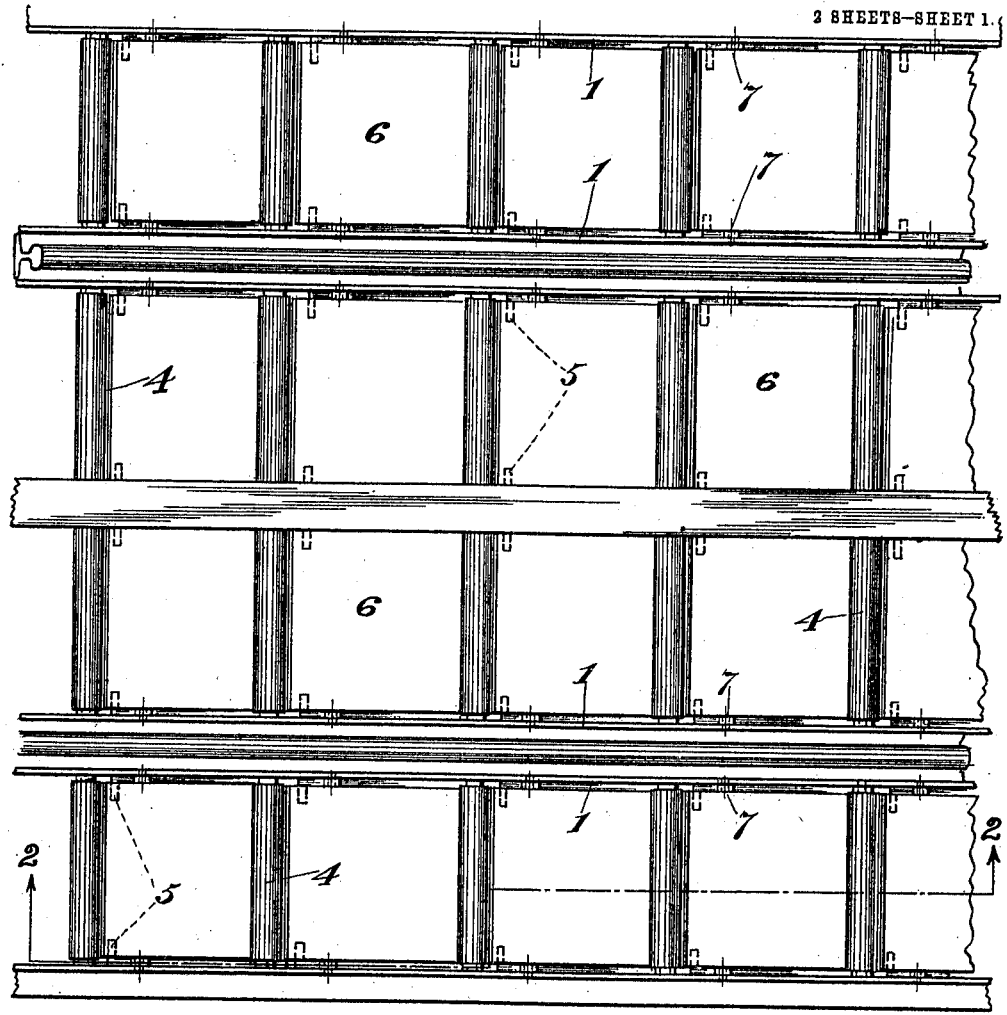

R. B. WALKER.
CATTLE GUARD.
APPLICATION FILED MAY 14, 1909.

980,033.

Patented Dec. 27, 1910.
2 SHEETS—SHEET 1.

Witnesses:

ROBERT B. WALKER
Inventor,

By

Attorneys

R. B. WALKER.
CATTLE GUARD.
APPLICATION FILED MAY 14, 1909.

980,033.

Patented Dec. 27, 1910.
2 SHEETS—SHEET 2.

Witnesses:

ROBERT B. WALKER
Inventor,

By
Attorneys

UNITED STATES PATENT OFFICE.

ROBERT B. WALKER, OF STRATHCONA, ALBERTA, CANADA.

CATTLE-GUARD.

980,033.  Specification of Letters Patent.  Patented Dec. 27, 1910.

Application filed May 14, 1909. Serial No. 496,028.

*To all whom it may concern:*

Be it known that I, ROBERT B. WALKER, a subject of the King of Great Britain, residing at Strathcona, county of Strathcona, in the Province of Alberta, Canada, have invented certain new and useful Improvements in Cattle-Guards; and I do hereby declare that the following is a full, clear, and exact description of the invention, such as will enable others skilled in the art to which it appertains to make and use the same.

The invention to be hereinafter described relates to cattle guards, and more particularly to railway cattle guards.

Broadly speaking, it comprises a series of beams, a plurality of striking rods pivotally supported between the beams, and pivotally mounted plates adapted to operate the striking rods.

As heretofore constructed, the great majority of cattle guards have been so built as to make it impossible for cattle to get a reliable footing on them. The usual form of cattle guard works entirely on this principle.

The present invention is a radical departure from this former principle, and, accordingly, involves a totally new principle. The present guard is so constructed as to make it very easy for horses and cattle to enter upon the same. However, as soon as they enter upon the guard, they operate mechanism which will give them a sharp stinging rap on the shins, and, at the same time, prevent further advance. Such an unexpected rap, of course, drives the cattle at once from the guard.

In order to more clearly disclose the construction, operation and use of the invention, reference should be had to the accompanying drawings forming part of the present application.

Throughout the several views of the drawings, like reference characters designate the same parts.

Figure 2:
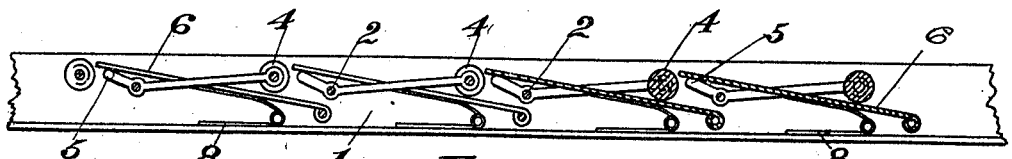
Figure 3:
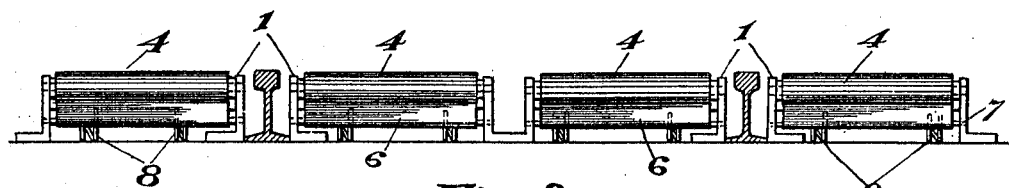
Figure 4:
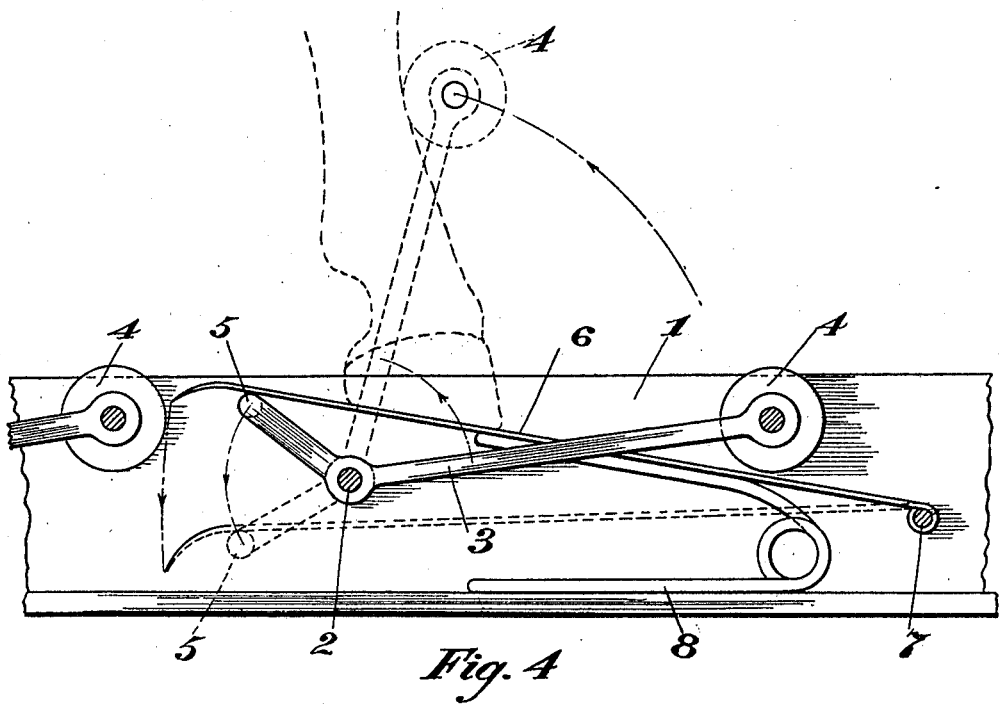

In the drawings: Figure 1 is a plan view of the invention; Fig. 2 is a longitudinal cross section on line 2—2 of Fig. 1; Fig. 3 is a lateral cross section of Fig. 1; and, Fig. 4 is an enlarged detail elevation of the striker rod operating mechanism.

In the preferred form of the invention, the guard comprises a plurality of similar sections, each complete in itself and adapted to be placed parallel with the rails of a track. Since all of the sections are substantially the same, a detailed description of a single one will suffice.

A pair of angle irons, or other suitable form of beams 1, is provided. These beams are connected at intervals by bars 2, and on opposite ends of these bars are journaled elbow levers 3. The ends of the long arms of the levers 3 are connected in pairs by striking rods 4, and the ends of the short arms of the levers are provided with offsets 5 adapted to underlie and support the rear free end of a broad, flat tread plate 6, which has its opposite end journaled on a pivot 7 in advance of and below the striking rod 4. The plate 6 is normally slightly elevated by the spring 8, which may be seated between it and the foot of the beam 1. In such normal position, the striking rod 4 will lie on the top of the plate 6, and the offsets 5 will just touch the under face of the same. Consequently, the general appearance of the guard is that of a series of successive tread plates interrupted at regular intervals by short transverse rods.

The operation of the invention is as follows: A horse, attempting to escape along the track, will unhesitatingly step upon the first tread plate 6. As soon as a weight is brought to bear on this plate, it will drive the short arms of the levers 2 sharply down. This, of course, drives the long arms up with much greater rapidity, so that the rods 4 will strike the horse a sharp stinging blow across the shin. Such treatment is, of course, totally unexpected, and the horse will jerk his foot from the plate at once. Besides this striking action, the rod 4, of course, also forms a barrier against any possible further advance, and so prevents as well as discourages any further forward movement.

It is clear that changes may be made in the construction, arrangement and disposition of the several parts of the invention, without in any way departing from the field and scope of the same, and it is meant to include all such within this application, wherein only a preferred form has been disclosed.

Having thus fully described my invention, what I claim as new, and desire to secure by Letters Patent, is:—

1. A cattle guard of the character described comprising beams, levers pivotally mounted on said beams and provided with offsets, striking rods connecting said levers in pairs and tread plates pivotally mounted beneath and in advance of said rods and resting upon the offsets of said levers.

2. A cattle guard of the character described comprising beams, bell crank levers pivotally mounted on said beams and provided with offsets extending from their short arms, striking rods connecting the long arms of said bell crank levers, and plates pivotally mounted beneath and in advance of said striking rods and resting upon said offsets.

3. A cattle guard of the character described comprising beams, levers pivotally mounted on said beams and provided with offsets, striking rods connecting said levers in pairs, tread plates pivotally mounted beneath and in advance of said rods and resting upon the offsets of said levers, and means for holding said tread plates normally inoperative.

In witness whereof I have hereunto set my hand in the presence of two witnesses.

ROBERT B. WALKER.

Witnesses:
S. A. BRICKMAN,
CHAS. H. GRANT.